United States Patent Office 2,947,723
Patented Aug. 2, 1960

2,947,723

CHLOROETHYLENE POLYMERS STABILIZED WITH 2,4-DIHYDROXY-3-ALLYL BENZOPHENONE AND SUBSTITUTED DERIVATIVES THEREOF

Gerald A. Clark, Midland, Mich., assignor to The Dow Chemical Company, Midland, Mich., a corporation of Delaware No Drawing. Filed Nov. 7, 1956, Ser. No. 620,803

3 Claims. (Cl. 260—45.95)

This invention relates to new organic compounds and to polymeric compositions containing the same. More particularly it relates to new organic compounds finding utility as light stabilizers for haloethylene polymers.

Haloethylene polymers such as those containing at least 50 percent vinylidene chloride, are known to be highly sensitive to the effects of elevated temperatures and of light and under prolonged exposure to heat and light may become so degraded and discolored as to be commercially useless. It has been common practice to blend certain compounds with the polymer to stabilize it against the degradative effects of heat and light. Several of such compounds, however, are highly colored materials which impart an objectionable initial color to the stabilized composition which prevents the production of a commercially saleable white composition. Still other disadvantages of many of the previous compounds are a high odor level and volatility. Any odor in the stabilizer will be transferred to the stabilized composition. When volatile stabilizers are employed the stabilizers volatilize out of the composition leaving the composition in time unprotected against the degradative effects of light, particularly ultra-violet light. In addition all of the compounds vary in their ability to absorb ultra-violent light and it is impossible to predict the effectiveness of any particular compound with any degree of certainty, and even then some of the initially useful compounds in the compositions lose some of their effectiveness for absorbing ultra-violet light over a prolonged period of time.

In view of the above problems it would be desirable and it is the principal object of this invention to provide a new group of organic compounds having the stated utility.

It is a further object to provide a group of such compounds which have little or no color and have a low odor level.

Another object is to provide a group of such compounds which have low volatility.

The above and related objects are accomplished by means of a group of 2,4-dihydroxybenzophenone derivatives having the general formula:

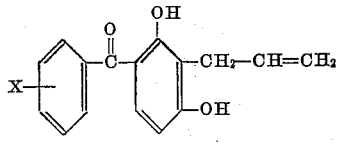

wherein X is selected from the group consisting of hydrogen, alkyl, and halogen. The objects are further realized with compositions comprising such ethers together with haloethylene polymers.

The stabilizers of this invention are easily prepared by a rearrangement of the corresponding 4-(2,3-propenoxy) derivative. In an illustrative preparation one mole of sodium ethoxide and one mole of 2,4-dihydroxybenzophenone were dissolved in one liter of alcohol. One mole of allyl chloride was added dropwise and the reaction solution was heated at reflux for two hours. The reaction solution was then cooled and poured into an excess of water. The mixture was allowed to stand overnight and the product extracted with benzene. The product was distilled at 1 millimeter mercury collecting that portion from 166° to 178° C. The crude product was recrystallized from methanol to give 2-hydroxy-4-(2,3-propenoxy) benzophenone in the form of pale yellow crystals melting at 67.5 to 68.5° C. The pure 2-hydroxy-4-(2,3-propenoxy)benzophenone was refluxed at about 200° C. at 1 millimeter mercury for four hours giving the 2,4-dihydroxy-3-allyl benzophenone in the form of pale yellow crystals melting at 169° to 170° C.

As typical of other representative compounds falling within the scope of the invention may be mentioned: 2,4-dihydroxy-3-allkyl-4'-chloro benzophenone, 2,4-dihydroxy-3-allyl-4'-ethyl benzophenone.

The stabilizers of this invention are effective stabilizers for haloethylene polymers, particularly those polymers containing at least 50 percent vinylidene chloride. Such polymers are known to be especially sensitive to the degradative effects of light and are accordingly preferred subjects for such stabilization. The stabilizers are effective when employed in a concentration of from 0.5 to 6.0 percent by weight based on the weight of the polymer used in the formulation. Compositions containing less than 1 percent exhibit little more stability than unstabilized compositions. No beneficial result accrues from the use of more than 6 percent, and the cost and physical properties, such as strength, which are dependent largely on the polymer suffer.

The stabilizers of this invention may, if desired, be blended with the polymer by any known formulating procedure, such as milling, dry blending, and similar procedures. However, since the stabilizers are olefinically unsaturated materials, they may be included as polymerizable components in the initial polymerization recipe. In that procedure the light stabilizing adjuvant becomes a permanent part of the polymer itself and cannot be leached from the polymer or destroyed as a stabilizer except by chemical reaction with the active hydroxybenzophenone structure. Additionally since most commercial-polymerization reactions are conducted in aqueous dispersion with agitation there is good assurance that the light stabilizer will be uniformly distributed throughout the polymer. Uniform distribution of any additive throughout a polymer formulation using the conventional post-polymerization formulating techniques is a time consuming and costly operation.

The stabilizers may be used in polymer compositions in conjunction with the other common additives, such as pigments, fillers, heat stabilizers, and plasticizers. They likewise may be employed in combination with other known light stabilizers.

The advantages of the compositions of this invention will be more apparent from the following illustrative example wherein all parts and percentages are by weight.

*Example*

Basic polymer formulations were prepared by blending 89.5 parts of a copolymer prepared from 85 percent vinylidene chloride and 15 percent vinyl chloride with 7 parts of a pentaerythritol tetraester whose ester groups had an average of 8 to 10 carbons, and 0.5 part of sodium tripolyphosphate as a heat stabilizer. One of the basic formulations was left unstabilized to light for use as a blank. To one was added 3 parts of phenyl salicylate for comparative purposes, and to another was added 3 parts of 2,4-dihydroxy-3-allyl benzophenone. Moldings having a thickness of 0.1 inch were prepared and exposed to ultra-violet sunlamps for 4 days. The moldings were examined visually following exposure for discoloration and rated according to an arbitrary scale wherein 0 means colorless, 5 means tan, 10 means brown, 15 means dark brown, and 20 means black. It was found that the unstabilized formulation rated 17, the formulation stabilized with phenyl salicylate rated 7, and the formulation stabilized in accordance with this invention rated 3.

Similar results are obtained in stabilizing polyvinyl chloride with the new stabilizers.

I claim:

1. A light stable thermoplastic composition comprising a chloro-ethylene polymer composed of at least 50 percent by weight of vinylidene chloride with any remainder being of at least one monoethylenically unsaturated comonomer and from 0.5 to 6 percent of the weight of said polymer of a 2,4-dihydroxybenzophenone derivative having the general formula:

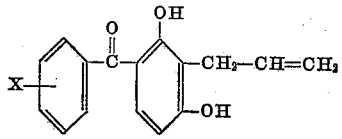

wherein X is selected from the group consisting of hydrogen, alkyl having from 1 to about 8 carbon atoms, and chlorine.

2. The composition claimed in claim 1 wherein said 2,4-dihydroxybenzophenone derivative is 2,4-dihydroxy-3-allyl benzophenone.

3. The composition claimed in claim 1 wherein said chloro-ethylene polymer is a copolymer composed of at least 50 percent by weight of vinylidene chloride with any remainder of vinyl chloride.

References Cited in the file of this patent
UNITED STATES PATENTS

| | | |
|---|---|---|
| 2,182,786 | Coleman | Dec. 12, 1939 |
| 2,434,496 | Houtman | Jan. 13, 1948 |
| 2,659,709 | Daglish | Nov. 17, 1953 |
| 2,682,559 | Stanley | June 29, 1954 |

OTHER REFERENCES

Fuson et al.: J. Am. Chem. Soc., 73, 4980–1, October 1951.